United States Patent
Maeda et al.

(10) Patent No.: US 7,619,813 B2
(45) Date of Patent: Nov. 17, 2009

(54) WAVELENGTH DIVISION MULTIPLEXING DEVICE, AN OPTICAL LEAKAGE PREVENTION METHOD, AND A WAVELENGTH DIVISION MULTIPLEXING COMMUNICATION SYSTEM

(75) Inventors: Taizo Maeda, Kawasaki (JP); Satoru Okano, Yokohama (JP); Takehiro Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/155,537

(22) Filed: Jun. 20, 2005

(65) Prior Publication Data

US 2006/0221435 A1 Oct. 5, 2006

(30) Foreign Application Priority Data

Mar. 30, 2005 (JP) ............................. 2005-099882

(51) Int. Cl.
*H04B 10/17* (2006.01)
*H04B 10/12* (2006.01)

(52) U.S. Cl. ..................... 359/341.42; 398/38; 398/94

(58) Field of Classification Search ............... 398/94, 398/38, 42; 359/337.11, 341.42, 94
See application file for complete search history.

(56) References Cited

U.S. PATENT DOCUMENTS

| | | | | |
|---|---|---|---|---|
| 5,528,404 A * | 6/1996 | MacKichan | ................... | 398/21 |
| 6,229,631 B1 * | 5/2001 | Sato et al. | ..................... | 398/30 |
| 6,275,330 B1 * | 8/2001 | Izumi | ..................... | 359/341.42 |
| 6,404,525 B1 * | 6/2002 | Shimomura et al. | ........... | 398/82 |
| 6,441,955 B1 * | 8/2002 | Takatsu et al. | ........... | 359/341.4 |
| 6,490,727 B1 * | 12/2002 | Nazarathy et al. | ........... | 725/129 |
| 6,707,550 B1 * | 3/2004 | Georgis et al. | ............... | 356/326 |
| 6,788,844 B2 * | 9/2004 | Ng | ............... | 385/24 |
| 6,807,370 B2 * | 10/2004 | Harasawa | ..................... | 398/13 |
| 6,895,183 B2 * | 5/2005 | Shimomura et al. | ........... | 398/34 |
| 6,977,771 B2 * | 12/2005 | Asao et al. | ............. | 359/341.41 |
| 6,987,922 B2 * | 1/2006 | Bierman et al. | ............. | 385/140 |
| 7,224,899 B2 * | 5/2007 | Noheji | ........................ | 398/33 |
| 2002/0131116 A1 * | 9/2002 | Shimomura et al. | ......... | 359/124 |
| 2002/0186460 A1 * | 12/2002 | Lelic | ........................ | 359/341.4 |
| 2003/0223728 A1 * | 12/2003 | Maeda et al. | ............... | 385/140 |
| 2004/0141759 A1 * | 7/2004 | Stiscia et al. | ................ | 398/168 |
| 2004/0208518 A1 * | 10/2004 | Bosloy et al. | ................ | 398/30 |

(Continued)

FOREIGN PATENT DOCUMENTS

JP 2004-007058 1/2004

*Primary Examiner*—Eric Bolda
(74) *Attorney, Agent, or Firm*—Staas & Halsey LLP

(57) ABSTRACT

A wavelength division multiplexing (WDM) device, an optical leakage prevention method, and a WDM communication system are disclosed. The WDM device includes a level adjusting unit for receiving an optical signal, for adjusting the optical power level of the received optical signal, and for outputting the level-adjusted optical signal; and a controlling unit for analyzing the optical power level of the optical signal output from the level adjusting unit, for controlling the level adjusting unit so that the optical power level of the output optical signal stays at a constant level, and for transitioning to an "off-state" when the optical power level of the output optical signal becomes less than a predetermined disconnection-detection threshold so that the level adjusting unit gives a predetermined attenuation to the input optical signal. The controlling unit transitions from the "off-state" when the optical power level of the output optical signal is greater than a predetermined recovery threshold and an upstream WDM device is not in the "off-state".

8 Claims, 12 Drawing Sheets

U.S. PATENT DOCUMENTS

| | | | |
|---|---|---|---|
| 2005/0047781 A1* | 3/2005 | El-Reedy et al. | 398/37 |
| 2005/0158057 A1* | 7/2005 | Tomofuji et al. | 398/160 |
| 2005/0168806 A1* | 8/2005 | Maeda et al. | 359/341.4 |
| 2006/0269284 A1* | 11/2006 | Fujita | 398/38 |

* cited by examiner

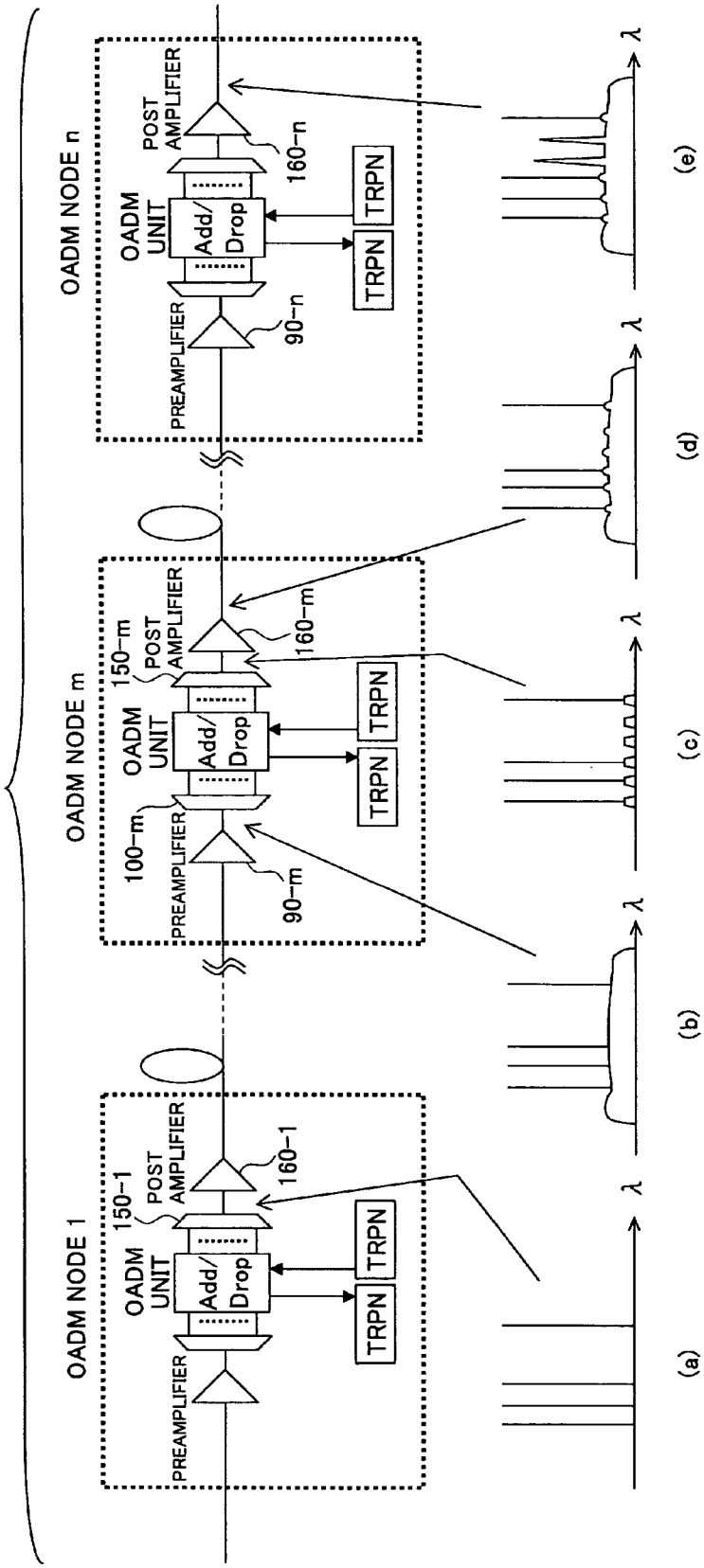

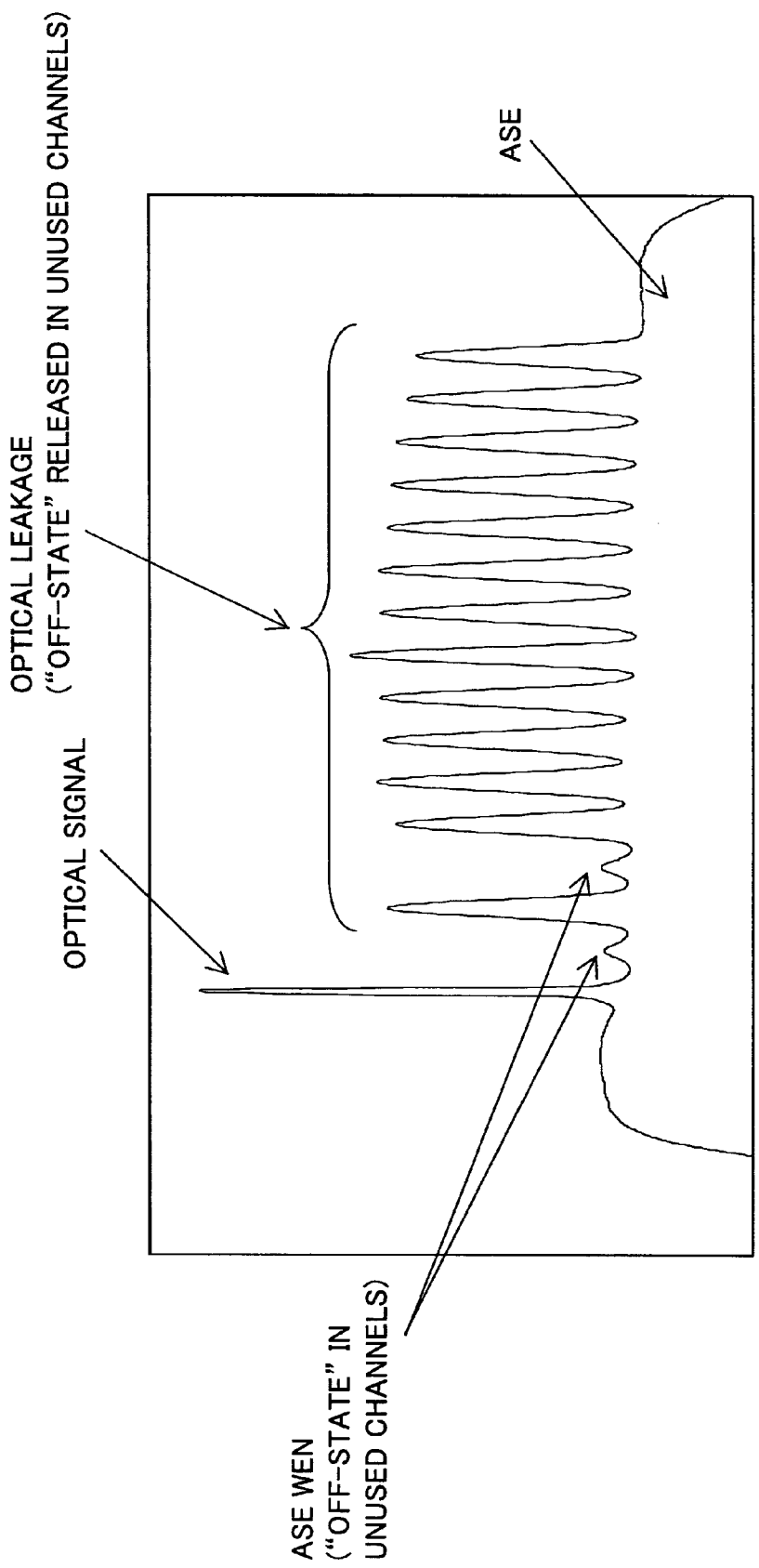

L1: VOA OUTPUT TARGET
A1: FIXED ATTENUATION AMOUNT IN OFF-STATE
Th_d: DISCONNECTION-DETECTION THRESHOLD
Th_r: RECOVERY THRESHOLD

L1: VOA OUTPUT TARGET
Th_d: DISCONNECTION-DETECTION THRESHOLD
Th_r: RECOVERY THRESHOLD

"OFF-STATE" DETECTED WITH Ch. X

"OFF-STATE" MAY BE RELEASED AT DOWNSTREAM NODES

"OFF-STATE" DETECTED WITH Ch. X

MOMENTARY RELEASE OF "OFF-STATE" AVOIDED BY TWO-WAY TRANSMISSION

⟶ PATH OF Ch. X
---▶ INFORMATION TRANSMISSION BY OSC

WAVELENGTH DIVISION MULTIPLEXING DEVICE, AN OPTICAL LEAKAGE PREVENTION METHOD, AND A WAVELENGTH DIVISION MULTIPLEXING COMMUNICATION SYSTEM

BACKGROUND OF THE INVENTION

1. Field of the Invention

The present invention generally relates to a wavelength division multiplexing device, an optical leakage prevention method, and a wavelength division multiplexing communication system, and especially relates to a wavelength division multiplexing device, an optical leakage prevention method, and a wavelength division multiplexing communication system that can adjust the optical power level.

2. Description of the Related Art

In order to maintain transmission quality of a wavelength division multiplexing communication system, it is important to reduce variations in the optical power level due to, for example, attenuation variation of optical parts and transmission lines, and gain variation of optical amplifiers. Especially, where the wavelength division multiplexing communication system is constituted by a great number of relays, tilts (variations of the optical power level by wavelength) are accumulated, and the wavelength variation of OSNR (optical S/N ratio) at a receiving end increases. Since degradation of OSNR causes an adverse influence on the system performance of the wavelength division multiplexing communication system as a reduction in the span length over which an optical signal can be transmitted, variations in the optical power level by wavelength have to be reduced.

As a method of reducing the variation in optical power level, a method of controlling and reducing the amount of the tilt is conceivable, wherein the tilt of the optical amplifier is compensated for by applying a tilt in an opposite direction of the tilt generated in the transmission line. Further, in the case where the wavelength division multiplexing communication system uses a distributed Raman amplifier (DRA), a method of controlling the optical power level of the excitation light of the DRA and compensating for the tilt is available. Either method is suitable for reduction of the tilt, such as reduction of a primary inclination.

FIG. 1 is a block diagram of an example of an OADM (Optical Add/Drop Multiplexing) node that constitutes a wavelength division multiplexing communication system. The OADM node is an example of a wavelength division multiplexing device. In the OADM node of FIG. 1, the variation in optical power level is reduced by the following methods.

According to a conventional OADM node (henceforth a node), a received optical signal is divided by wavelengths by a splitter 100. The divided optical signal is output to an adder 150 through a coupler (CPL) 120, after the optical power level is adjusted by a variable optical attenuator (VOA) 110. The coupler 120 divides the output of the variable optical attenuator 110 and sends one of the divided parts to a monitor photo diode (PD1) 130.

A control unit 140 analyzes the optical power level of the output of the variable optical attenuator 110 using the monitor photo diode (PD1) 130, and controls the magnitude of attenuation of the variable optical attenuator 110 so that the optical power level of the signal output from the variable optical attenuator 110 becomes a predetermined level (constant level control). According to this method, the optical power level of the signal output from the variable optical attenuator 110 is finely adjusted for every channel, and the variation in optical power level is properly reduced.

FIG. 2 is a control flowchart of the Node of FIG. 1. At Step S100, the control unit 140 controls the magnitude of attenuation of the variable optical attenuator 110 so that the optical power level of the signal output from the variable optical attenuator 110 becomes equal to a target VOA output level L1. The control unit 140 repeats Step S100 until the optical power level of the signal output from the variable optical attenuator 110 becomes less than a disconnection-detection threshold Th_d (i.e., so long as the condition is NO at S101). If the optical power level of the signal output from the variable optical attenuator 110 becomes less than the disconnection-detection threshold Th_d (i.e., YES at S101), the control unit 140 determines that the optical signal is no longer input (optical signal off), and transitions to an "off-state".

During the "off-sate", the control unit 140 controls the variable optical attenuator 110 so that the magnitude of attenuation of the variable optical attenuator 110 is set to a predetermined "off-state" attenuation A1 that is set at a magnitude of attenuation that can detect an input optical signal when the optical signal is resumed from the "off-state". If the optical power level of the signal output from the variable optical attenuator 110 becomes greater than a recovery threshold Th_r (i.e., YES at S103), the control unit 140 transitions from the "off-state", and resumes processing at Step S100. That is, the control unit 140 controls the magnitude of attenuation of the variable optical attenuator 110 so that the optical power level of the signal output from the variable optical attenuator 110 serves as the target VOA output level L1.

Patent Reference 1 discloses a technology wherein a variable optical attenuator of a node is controlled so that it autonomously reduces variations such that an optical surge, and the like, does not occur when a system becomes faulty.

[Patent Reference 1] JPA 2004-7058

Problem(s) to be Solved by the Invention

According to the Node structured as shown in FIG. 1, a coupler is provided in front of the variable optical attenuator 110, which is an advantage in that a level diagram of the Node can be improved, and that the Node can be made at a lesser cost with reduction of size. However, there are the following problems.

For example, when the attenuation of the transmission line is great, the Node has to increase the gain of a preamplifier 90. Accordingly, a spontaneous emission optical signal (Amplified Spontaneous Emission: ASE) generated by the Node increases. In the case of a wavelength division multiplexing communication system having a great number of relays, when the transmission line attenuation is great, the spontaneous-emission optical signal generated by the Node is great, and is accumulated. Consequently, at a down-stream node, it often happens that the optical power level of the signal output from the variable optical attenuator 110 becomes greater than the recovery threshold Th_r due only to the spontaneous-emission optical signal, even if the optical signal is not recovered.

FIG. 3 is a system diagram that shows a spontaneous emission optical signal being accumulated in the wavelength division multiplexing communication system having a great number of relays. At Section (a) of FIG. 3, an optical signal multiplexed by an adder 150-1 is represented. At Section (b) of FIG. 3, the optical signal amplified by a post amplifier 160-1 and a preamplifier 90-$m$ is shown, to which a spontaneous-emission optical signal is added.

When the optical signal with the spontaneous emission optical signal has passed through a splitter 100-*m* and an adder 150-*m*, the spontaneous-emission optical signal is filtered except for the wavelengths of the optical signal. Section (c) of FIG. 3 shows the optical signal after being filtered by the splitter 100-*m* and the adder 150-*m*. However, a wen (remnant, trace) of a spontaneous-emission optical signal remains in a channel that has no optical signal as shown at section (c). At section (d), the optical signal amplified by a post amplifier 160-*m* is shown, to which a spontaneous-emission optical signal is added.

Whenever the wen of a spontaneous-emission optical signal passes a node, the wen is accumulated. In this way, it is often the case that the optical power level of the spontaneous-emission optical signal becomes greater than the recovery threshold Th_r. If the optical power level of the spontaneous-emission optical signal becomes greater than recovery threshold Th_r, the control unit 140 resumes an "on-state" from the "off-state", and controls the magnitude of attenuation of the variable optical attenuator 110 so that the optical power level of the signal output from the variable optical attenuator 110 serves as the target VOA output level L1. That is, the variable optical attenuator 110 is fully released, the spontaneous-emission optical signal superfluously penetrates, and an optical leakage occurs. Section (e) expresses the optical leakage and the optical signal.

The optical leakage of the Node in FIG. 1 causes problems as follows. First, the optical leakage is a problem in that it generates a surge when a wavelength is added. For example, when there is an optical leakage, the variable optical attenuator 110 is fully released for applying constant level control of the output of the variable optical attenuator 110. If an optical signal is added to a channel that has the optical leakage, the optical power level cannot be appropriately adjusted by the variable optical attenuator 110 in the Node until the magnitude of attenuation of the variable optical attenuator 110 is reconfigured, which causes a surge to occur.

Second, the optical leakage causes a problem of producing a gap in an output set point of constant level control performed by the preamplifier 90 and the post amplifier 160. For example, the output value of the constant level control of the preamplifier 90 and the post amplifier 160 is varied by an optical leakage being added. When gains of several wavelengths are set up, the optical power level per wavelength is reduced according to the magnitude of the optical leakage that is added. Further, depending on methods of the constant level control, a solution may be attempted by recognizing an optical leakage as one wavelength, and by setting up the gain for all the optical signals and the optical leakage; however, in this case, an error of the output value is generated by the difference between the optical power level for one wavelength of the optical signals and the optical power level of the optical leakage.

FIG. 4 is a waveform chart showing the optical leakage and the optical signal. With the waveform chart of FIG. 4, the optical leakage occurs in a part of the frequency range that contains no optical signals. FIGS. 5A, 5B and 5C give graphs that express an example of level transition of an input optical signal, an output optical signal, and optical attenuation, respectively, of the variable optical attenuator 110 in normal operations. FIGS. 6A, 6B, and 6C give graphs that express an example of level transition of the input optical signal, the output optical signal, and the optical attenuation, respectively, of the variable optical attenuator 110 when there is an optical leakage. The example is where a resumption of the "on-state" is carried out from the "off-state" due to a spontaneous-emission optical signal.

As shown in FIG. 6A, even if the spontaneous-emission optical signal is added in the frequency range wherein no optical signal channels are present, the incident optical signal to the variable optical attenuator 110 in the "off-state" is greater than the case shown by FIG. 5A. For this reason, the optical power level of the optical signal output from the variable optical attenuator 110 becomes greater than the recovery threshold Th_r as shown in FIG. 6B, and the "on-state" is resumed. Accordingly, the problem with the Node shown in FIG. 1 is in that control of the variable optical attenuator 110 cannot be properly performed due to accumulation of the spontaneous-emission optical signal, and that there is a danger of an excessive surge occurring at the time of resumption.

SUMMARY OF THE INVENTION

The present invention is made in view of the problems, and aims at offering a wavelength division multiplexing device, an optical leakage prevention method, and a wavelength division multiplexing communication system that can prevent an optical leakage from being generated, substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a wavelength division multiplexing device, an optical leakage prevention method, and a wavelength division multiplexing communication system particularly pointed out in the specification in such full, clear, concise, and exact terms as to enable a person having ordinary skill in the art to practice the invention.

Means for Solving the Problem

In order to achieve these and other advantages and in accordance with the purpose of the invention, as embodied and broadly described herein, the invention provides a wavelength division multiplexing device that includes a level adjusting unit for adjusting an output optical power level of an optical signal that is input (input optical signal), and a controlling unit for analyzing the optical power level of the optical signal output by the level adjusting unit, controlling the level adjusting unit so that the optical power level of the optical signal output is fixed, transitioning to an "off-state" when the optical power level of the output optical signal becomes less than the disconnection-detection threshold, and controlling the level adjusting unit such that the input optical signal is optically attenuated by a predetermined amount. Here, if the optical power level of the output optical signal is greater than a recovery threshold, and if an upstream wavelength division multiplexing device is in the "on-state", the controlling unit resumes the "on-state".

The present invention further offers an optical leakage prevention method for a wavelength division multiplexing device, the method including a step of inputting an optical signal, adjusting the level thereof, and outputting the level-adjusted optical signal, a step of analyzing the optical power level of the optical signal that is output, a step of controlling the optical power level of the output optical signal to become fixed, a step of controlling a transition to the "off-state" when the optical power level of the output optical signal becomes less than the disconnection-detection threshold, so that a predetermined optical attenuation is given to the input optical signal, and a step of resuming the "on-state" from the "off-state" if the optical power level of the output optical signal becomes greater than a recovery threshold, and if an upstream wavelength division multiplexing device is in the "on-state".

The present invention further offers a wavelength division multiplexing communication system that includes two or more wavelength division multiplexing devices. The wavelength division multiplexing device includes a level adjusting unit for adjusting an output optical power level of a optical signal that is input (input optical signal), and a controlling unit for analyzing the optical power level of the optical signal output by the level adjusting unit, controlling the level adjusting unit so that the optical power level of the optical signal output is fixed, transitioning to an "off-state" when the optical power level of the output optical signal becomes less than the disconnection-detection threshold, and controlling the level adjusting unit such that the input optical signal is optically attenuated by a predetermined amount. Here, if the optical power level of the output optical signal is greater than a recovery threshold, and if an upstream wavelength division multiplexing device is in the "on-state", the controlling unit resumes the "on-state".

As described above, according to the present invention, resuming "on-state" from "off-state" takes place under two conditions simultaneously fulfilled, i.e., when the optical power level of the output optical signal is greater than the recovery threshold, and when an upstream wavelength division multiplexing device is not in the "off-state"; in this way, resumption from the "off-state" due to a spontaneous-emission optical signal is prevented from occurring, and an optical leakage is prevented from occurring.

Effect of the Invention

As described above, the present invention provides the wavelength division multiplexing device, the optical leakage prevention method, and the wavelength division multiplexing communication system, wherein generation of the optical leakage is avoided.

BRIEF DESCRIPTION OF THE DRAWINGS

FIG. 3 is a block diagram with associated graphs showing the wavelength division multiplexing communication system of FIG. 1 with multiple relays, wherein a spontaneous-emission optical signal is accumulated;

FIG. 4 is a waveform chart showing an optical leakage and an optical signal;

DESCRIPTION OF THE PREFERRED EMBODIMENTS

In the following, embodiments of the present invention are described with reference to the accompanying drawings. In the following, an OADM node is described as an example of the wavelength division multiplexing device of the present invention.

Embodiment 1

Figure 7:
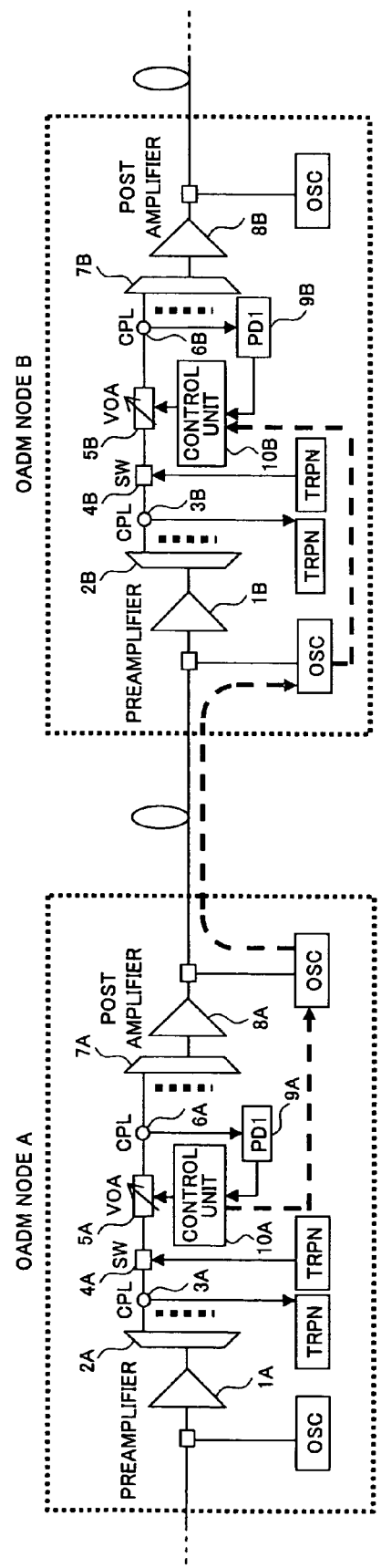
FIG. 7 is a block diagram of the OADM node that constitutes a wavelength division multiplexing communication system according to an embodiment of the present invention.

FIG. 7 is a block diagram of the OADM node that constitutes a wavelength division multiplexing communication system according to the embodiment of the present invention. FIG. 7 shows an OADM node A (henceforth Node A), and an OADM node B (henceforth Node B) that represent a part of the wavelength division multiplexing communication system. Node A includes a preamplifier 1A, a splitter 2A, a coupler 3A, a switch 4A, the variable optical-attenuator 5A, a coupler 6A, an adder 7A, a post amplifier 8A, a monitor PD1 9A, and the control unit 10A. Node B includes a preamplifier 1B, a splitter 2B, a coupler 3B, a switch 4B, a variable optical-attenuator 5B, a coupler 6B, an adder 7B, a post amplifier 8B, a monitor PD1 9B, and the control unit 10B. Here, the configurations and operations of Node A and Node B are the same.

Node A receives an optical signal from a transmission line, and outputs the optical signal to a transmission line via the preamplifier 1A, the splitter 2A, the coupler 3A, the switch 4A, the variable optical-attenuator 5A, the coupler 6A, the adder 7A, and the post amplifier 8A. Node A also provides the optical signal that is branched off by the coupler 6A to the monitor PD1 9A. The monitor PD1 9A outputs a voltage based on the optical power level of the branched off optical signal to the control unit 10A. The control unit 10A analyzes the voltage received from the monitor PD1 9A, the voltage being based on the optical power level of the optical signal, and controls the magnitude of attenuation of the variable optical-attenuator 5A so that the optical power level of the signal output from the variable optical-attenuator 5A becomes equal to a target VOA output level L1.

The preamplifier 1A amplifies the optical signal input from the transmission line, and outputs the optical signal to the splitter 2A. The splitter 2A divides the amplified optical signal by wavelengths. Each wavelength is output to a path provided for the corresponding wavelength. The path is a structure that includes the coupler 3A, the switch 4A, the variable optical-attenuator 5A, the coupler 6A, the monitor PD1 9A, and the control unit 10A. The optical signal of each wavelength is output to the adder 7A through the coupler 6A, after the optical power level is adjusted by the variable optical-attenuator 5A. The adder 7A adds optical signals of every wavelength, and outputs the added optical signal to the post amplifier 8A. The post amplifier 8A amplifies the received optical signal, and outputs the amplified signal to the transmission line.

Figure 8:
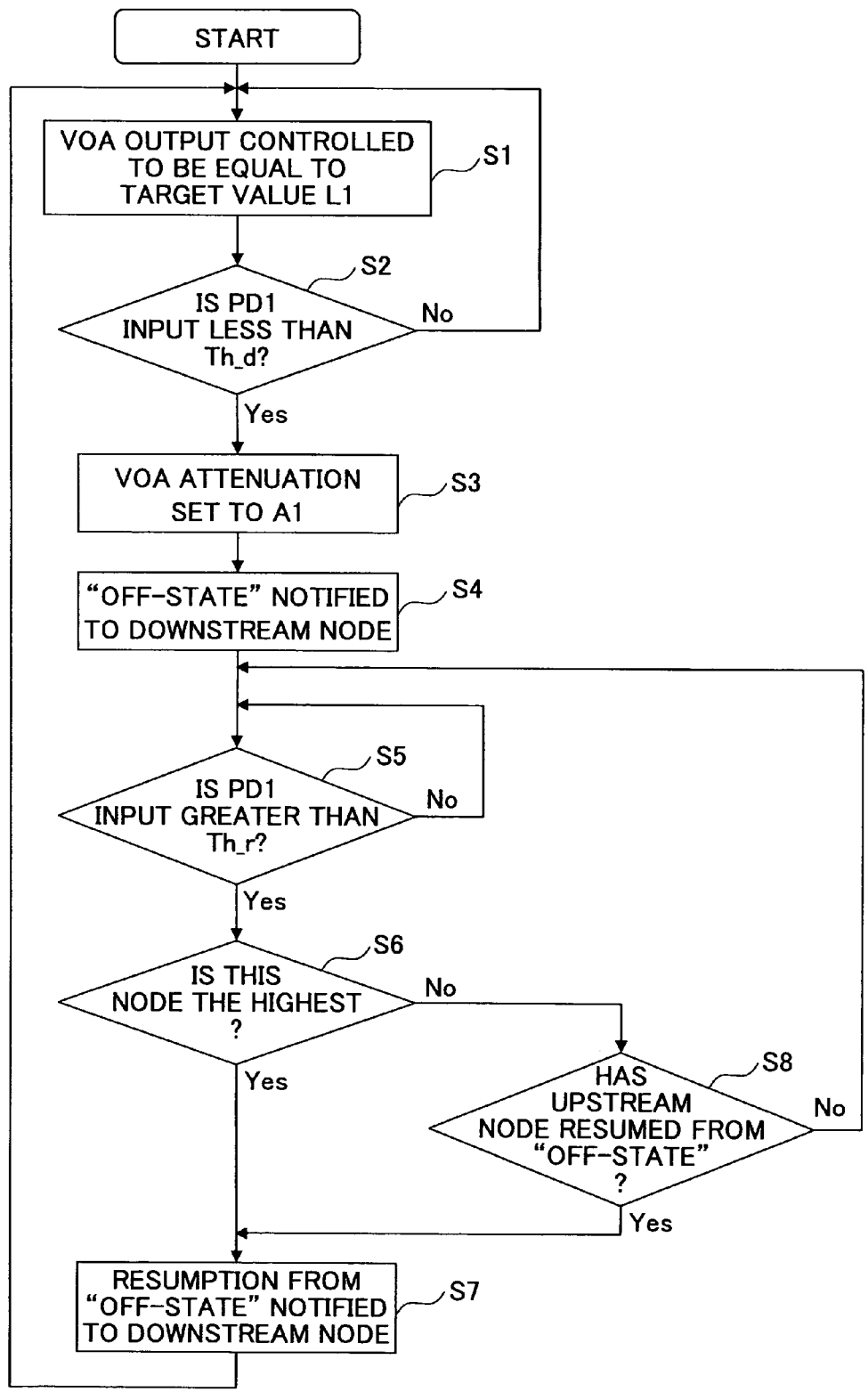
FIG. 8 is a control flowchart showing an example of a control process carried out by the control unit of the OADM node of FIG. 7.

Here, the control process carried out by the control unit 10A is explained, referring to FIG. 8, which is a control flowchart showing an example of the control process of the control unit 10A.

At Step S1, the control unit 10A controls the magnitude of attenuation of the variable optical-attenuator 5A so that the optical power level of the signal output from the variable optical-attenuator 5A becomes equal to the target VOA output level L1. The control unit 10A carries out Step S1 until the optical power level of the signal output from the variable optical-attenuator 5A becomes below the disconnection-detection threshold Th_d (i.e., NO at S2). When the optical power level of the signal output from the variable optical-attenuator 5A becomes less than the disconnection-detection threshold Th_d (i.e., YES at S2), the control unit 10A determines that the input signal is disconnected, and transitions to the "off-state".

In the "off-state", the control unit 10A carries out Step S3, wherein the variable optical-attenuator 5A is controlled so that the magnitude of attenuation of the variable optical-attenuator 5A becomes equal to a fixed magnitude A1 defined for the "off-state". The fixed magnitude of attenuation A1 is made the magnitude of attenuation at which an input optical signal can be detected when the input signal returns during the "off-state". Progressing to Step S4, the control unit 10A provides information about the "off-state" to a down-stream node (for example, Node B). The control unit 10A can provide the information about the "off-state" to the down-stream node via an OSC (Optical Supervisory Channel).

Then, the process proceeds to Step S5, wherein the control unit 10A determines whether the optical power level of the signal output from the variable optical-attenuator 5A is greater than a recovery threshold Th_r. If affirmative (YES at S5), the process progresses to Step S6, wherein whether the node concerned is "the highest node" is determined. (Here, "the highest node" is a node to which an optical signal is first provided, wherein no spontaneous optical signal is emitted.) If affirmative (YES at S6), the process progresses to Step S7, where information about transitioning from the "off-state" is provided to the down-stream node. The control unit 10A can use the OSC for providing the information to the down-stream node. Then, the control unit 10A returns to processing Step S1. That is, the control unit 10A controls the magnitude of attenuation of the variable optical-attenuator 5A so that the optical power level of the signal output from the variable optical-attenuator 5A becomes equal to the target VOA output level L1.

On the other hand, if the determination is negative, i.e., NO at S6, the process proceeds to Step S8, wherein it is determined whether an upstream node has transitioned from "off-state" to "on-state". If the determination is affirmative, i.e., YES at S8, the process progresses to Step S7. Otherwise, i.e., if NO at S8, the process returns to Step S5.

As shown by the control flowchart of FIG. 8, Node A by the present invention transitions from the "off-state" when two conditions are met; namely, when the optical power level of the signal output from the variable optical-attenuator 5A is greater than the recovery threshold Th_r, and when the upstream Node is not in the "off-state". Therefore, though the optical power level of the signal output from the variable optical-attenuator 5A becomes greater than the recovery threshold Th_r by accumulation of a spontaneous-emission optical signal, since the "off-state" is maintained, the optical leakage is not generated at Node A according to the present invention.

Here, "the highest node" transitions from the "off-state" when one condition is met; namely, when the optical power level of the signal output from the variable optical-attenuator 5A is greater than recovery threshold Th_r. This is because "the highest node", to which the optical signal is first input, does not generate a spontaneous-emission optical signal, and no optical leakage is generated.

Embodiment 2

As described above, according to Embodiment 1, the phenomenon of the "off-state" being canceled by the optical power level of the spontaneous-emission optical signal can be prevented. However, the case is conceivable, wherein the optical power level of the signal output from the variable optical-attenuator 5A does not become less than the disconnection-detection threshold Th_d due to the accumulated spontaneous-emission optical signal, as explained below with reference to FIGS. 9A, 9B, and 9C, which show an example of level transition of the input optical signal, the output optical signal, and optical attenuation, respectively, of the variable optical-attenuator 5A.

Figure 1:
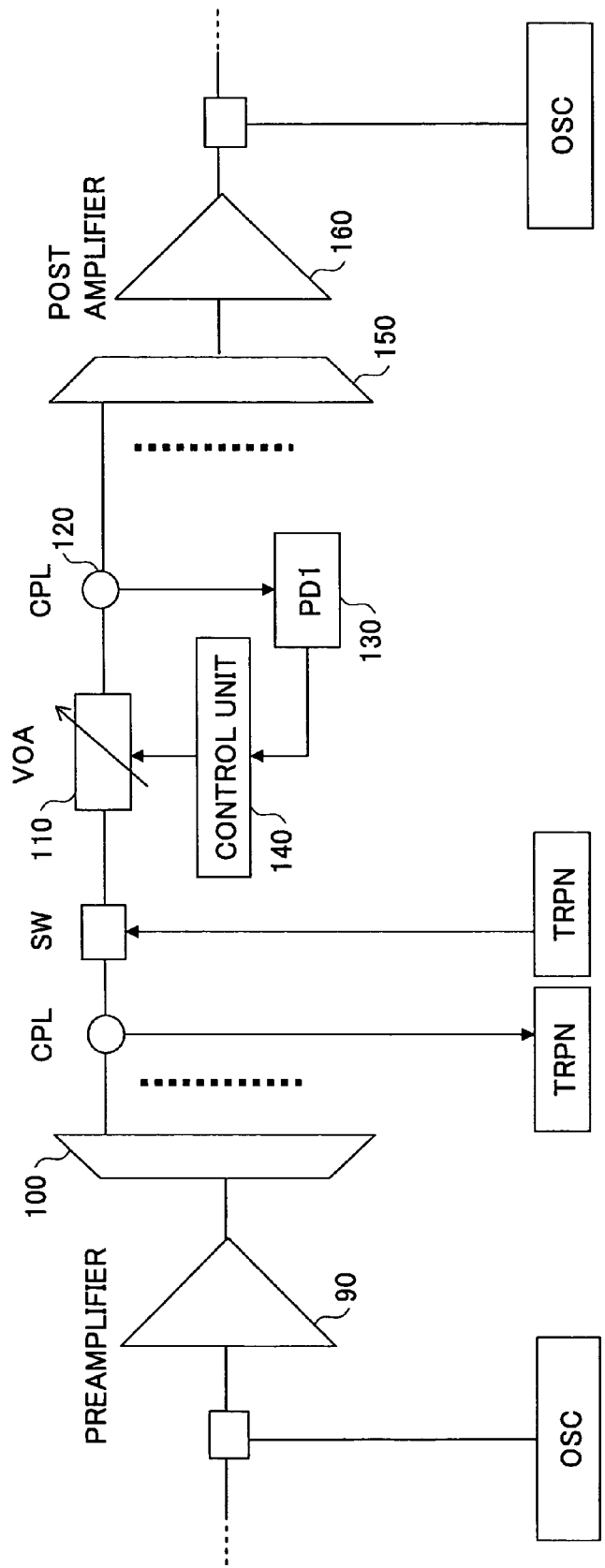
FIG. 1 is a block diagram showing an example of a conventional OADM node that constitutes a wavelength division multiplex communication system.
Figure 2:
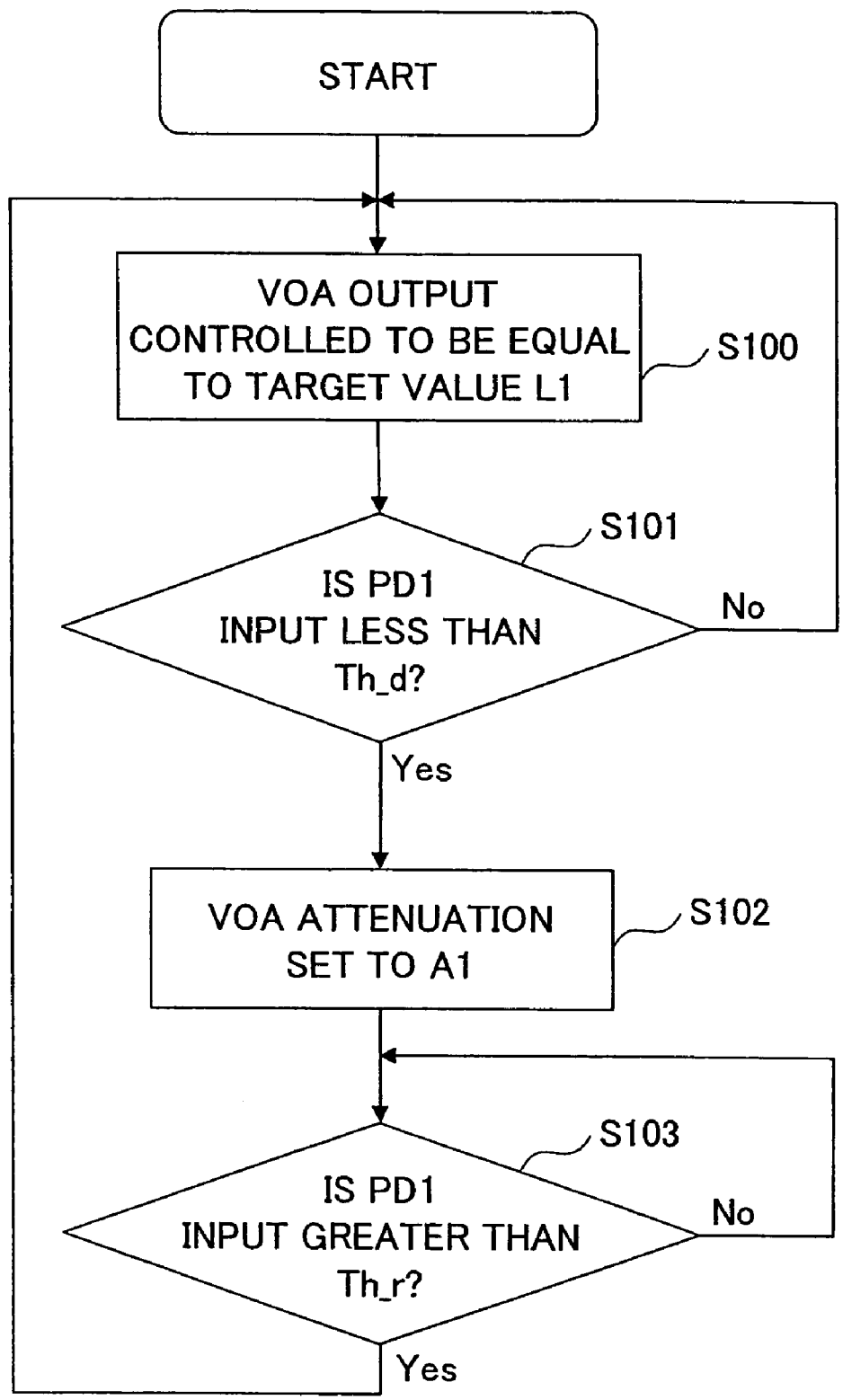
FIG. 2 is a control flowchart of the OADM node of FIG. 1.
Figure 5A:
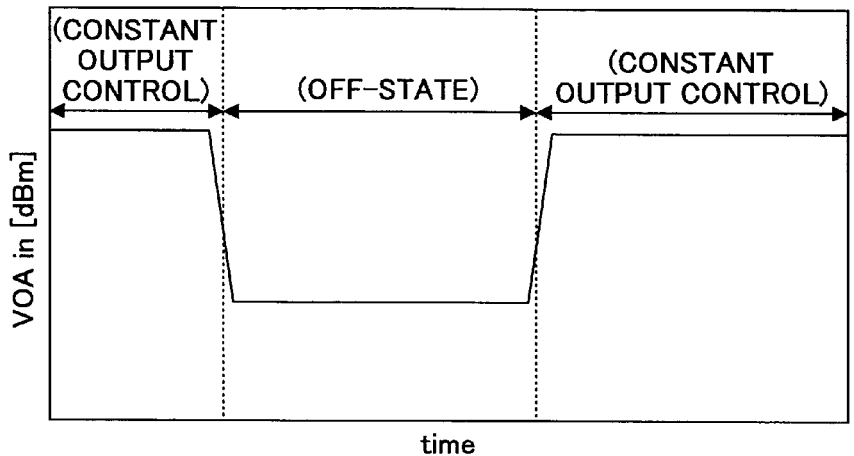
FIGS. 5A, 5B, and 5C are level diagrams showing an example of level transition of an input optical signal, an output optical signal, and optical attenuation, respectively, in normal operations.
Figure 5B:
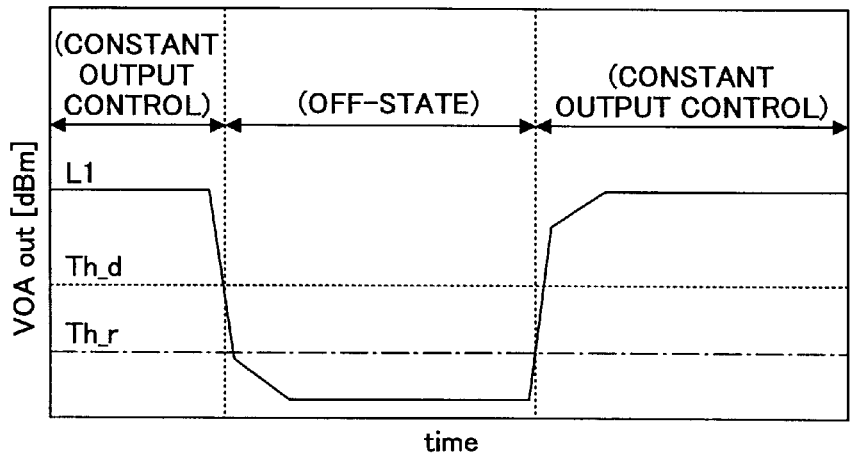
Figure 5C:
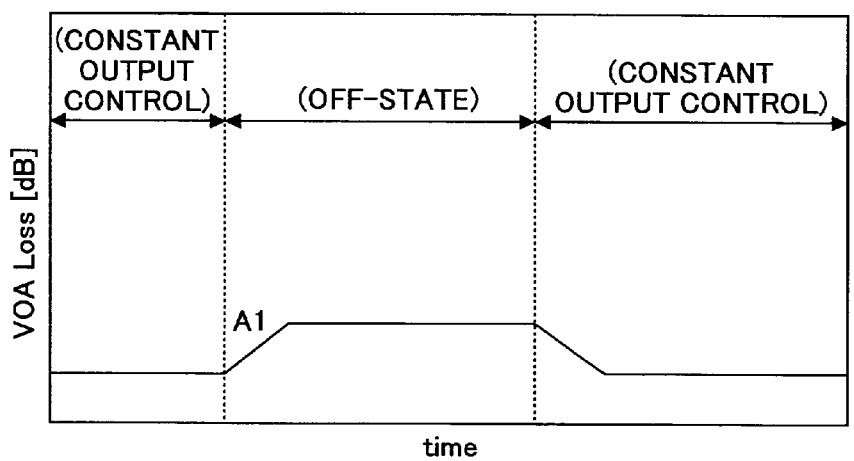
Figure 6A:
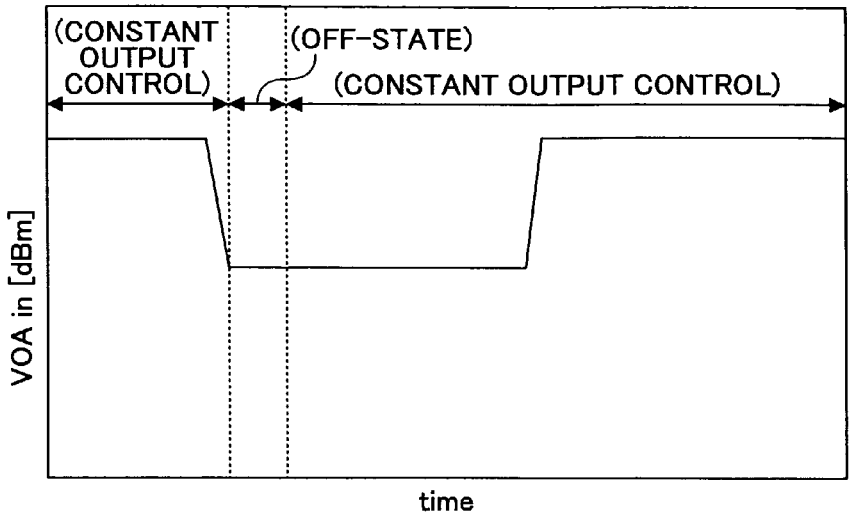
FIGS. 6A, 6B, and 6C are level diagrams showing an example of level transition of the input optical signal, the output optical signal, and the optical attenuation, respectively, when there is an optical leakage.
Figure 6B:
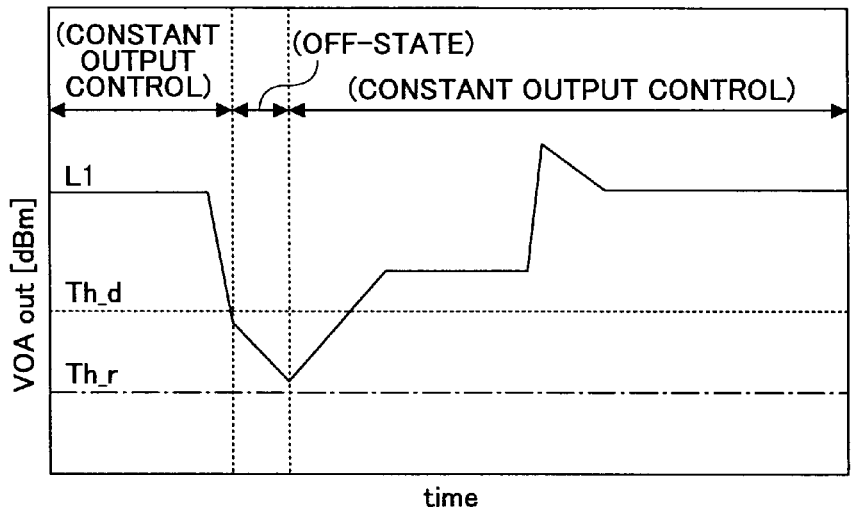
Figure 6C:
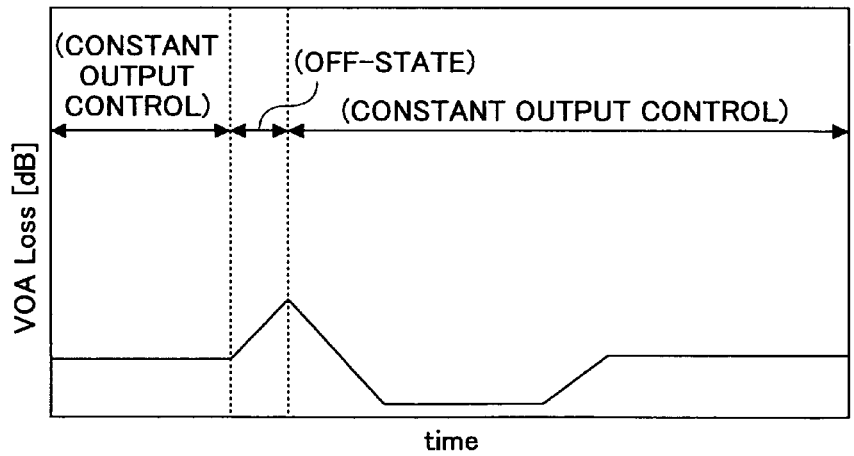
Figure 9A:
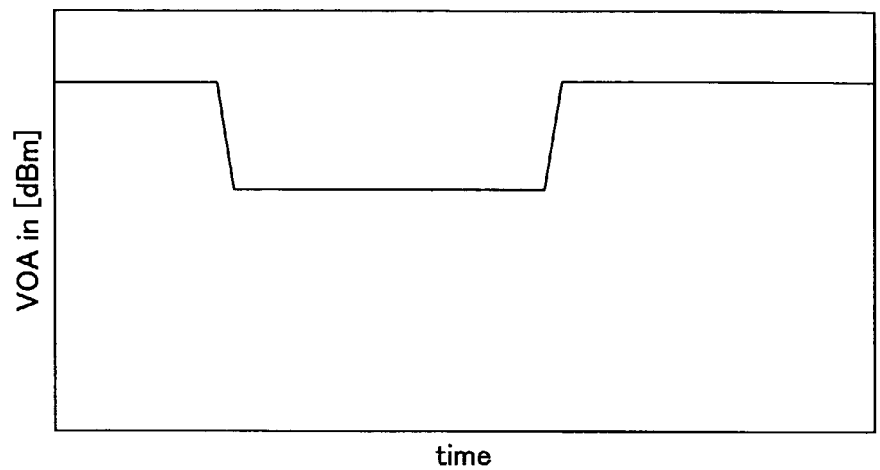
FIGS. 9A, 9B, and 9C are level diagrams showing an example of level transition of the input optical signal, the output optical signal, and the optical attenuation, respectively, of a variable optical attenuator according to the present invention.
Figure 9B:
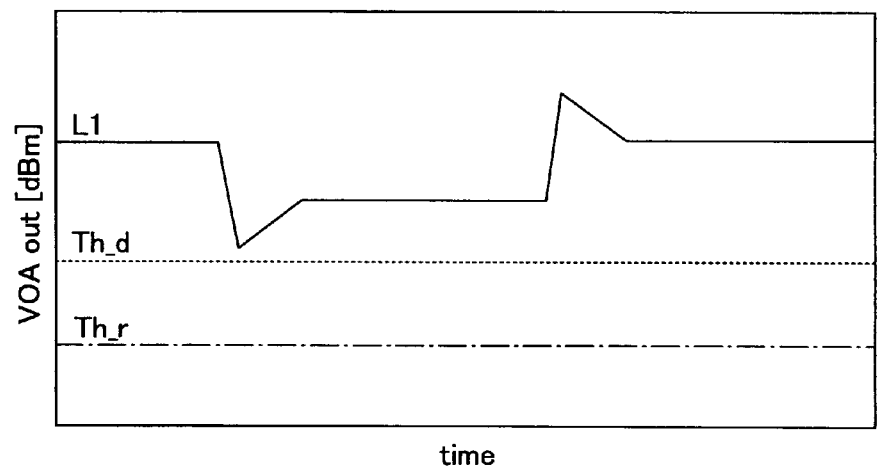
Figure 9C:
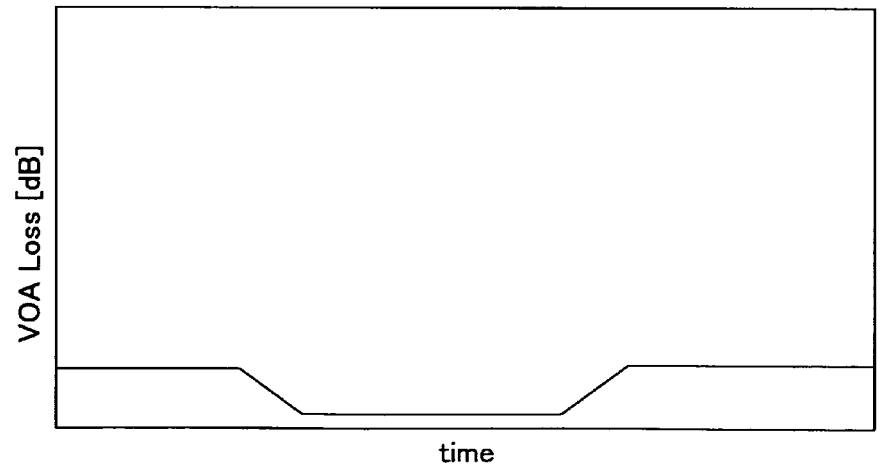

As shown in FIG. 9A, the power level of the optical signal input to the variable optical-attenuator 5A does not fall as much as shown in FIG. 5A by an amount corresponding to the accumulated spontaneous-emission optical signal even if it is in the unused frequency range. For this reason, as shown in FIG. 9B, the optical power level of the output optical signal from the variable optical-attenuator 5A becomes greater than the disconnection-detection threshold Th_d, and a transition to the "off-state" cannot be attained. In view of this, each Node of Embodiment 2 is made capable of detecting a rapid fall of the optical power level of own node such that the transition to the "off-state" is attained when the optical power level rapidly decreases.

Figure 10:
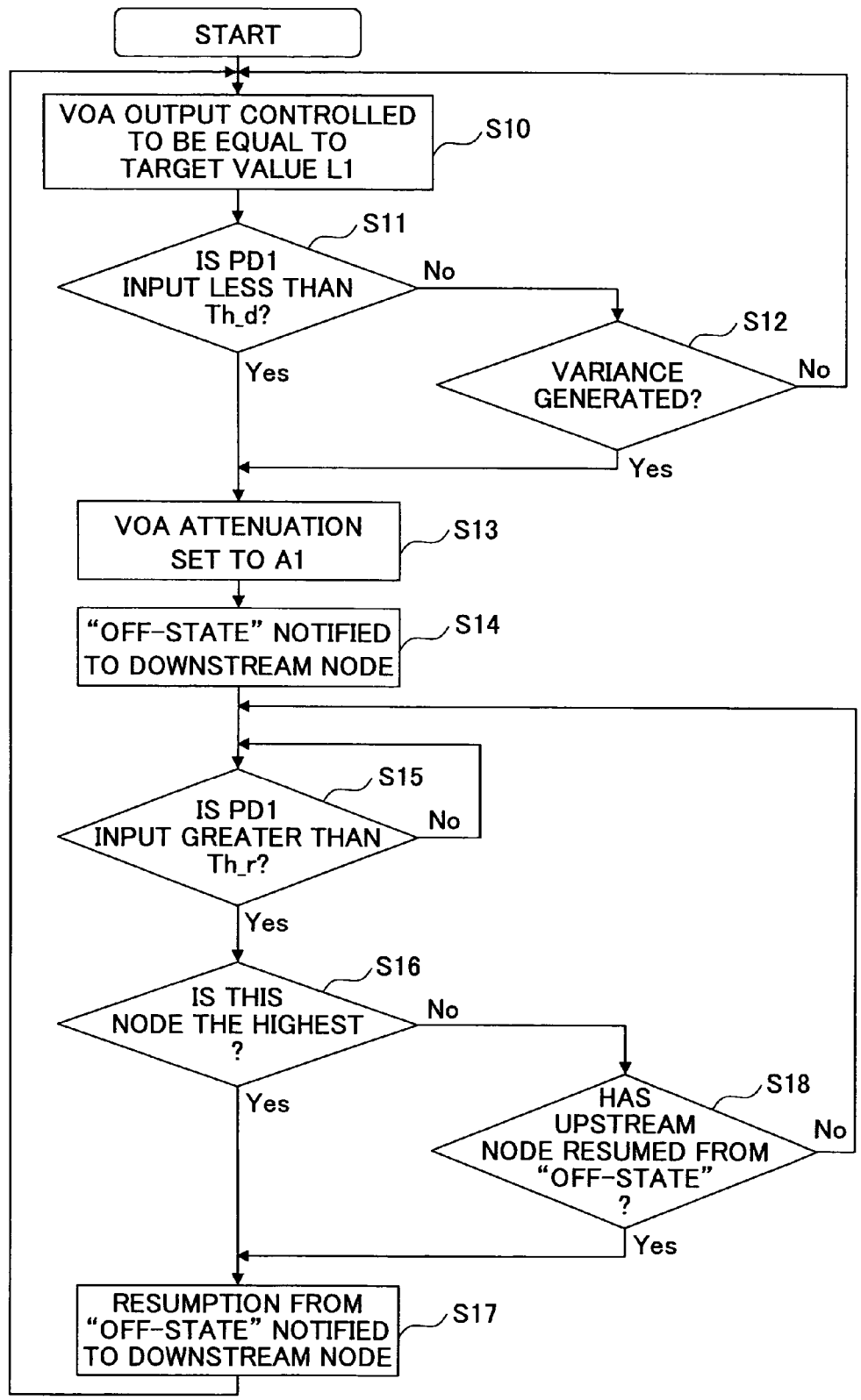
FIG. 10 is a control flowchart showing an example of the control process carried out by the control unit of FIG. 7.

The structure of Node A of Embodiment 2 is the same as that of Node A of Embodiment 1; accordingly, the structure shown in FIG. 7 applies. Descriptions follow about the control process of the control unit 10A of Node A according to Embodiment 2 with reference to the control flowchart of FIG. 10, which shows an example of the control process of the control unit 10A.

At Step S10, the control unit 10A controls the magnitude of attenuation of the variable optical-attenuator 5A so that the optical power level of the signal output from the variable optical-attenuator 5A becomes equal to the target VOA output level L1. Then, at Step S11, the control unit 10A determines whether the optical power level of the signal output from the variable optical-attenuator 5A is less than the disconnection-detection threshold Th_d.

If the determination is negative, i.e., NO at S11, the process proceeds to Step S12, where it is determined whether the optical power level of the signal output from the variable optical-attenuator 5A has rapidly decreased. If the determination is negative, i.e., NO at S12, the process returns to Step S10.

Under a condition that the optical power level of the signal output from the variable optical-attenuator 5A has become less than the disconnection-detection threshold Th_d, i.e., YES at S11, or if the determination at S12 is affirmative, YES at S12, the control unit 10A determines that the input signal is disconnected, and the transition to the "off-state" takes place.

Since Steps S13 through S18 after transitioning to the "off-state" are the same as Steps S3 through S8 of FIG. 8, explanation thereof is not repeated. As described above with reference to FIG. 10, Node A according to Embodiment 2 is capable of transitioning to the "off-state" even if the optical power level of the signal output from the variable optical-attenuator 5A does not become less than the disconnection-detection threshold Th_d, as shown in FIG. 9, due to the accumulated spontaneous-emission optical signal.

The rapid fall of the optical power level of the signal output from the variable optical-attenuator 5A is detected by continuously monitoring a voltage based on the optical power level of the optical signal received by the monitor PD1 9A, and by comparing a change of the voltage in a unit of time with a predetermined threshold (e.g., 5 dB/3 ms, and 10 dB/500 μs). When the speed of the change exceeds the threshold, it is determined that the optical power level is rapidly decreasing.

As described, in Node A of Embodiment 2, the transition to the "off-state" takes place even if the optical power level from the variable optical-attenuator 5A does not become less than the disconnection-detection threshold Th_d due to the accumulated spontaneous-emission optical signal, as shown in FIG. 9. Accordingly, the optical leakage is prevented from occurring.

Embodiment 3

Figure 11:
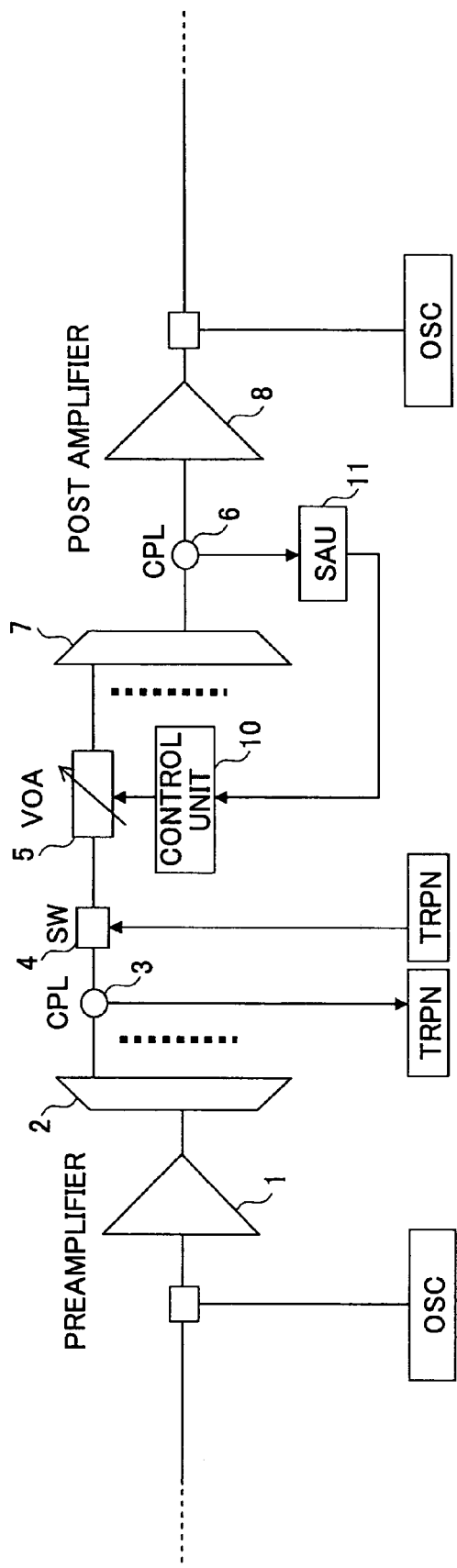
FIG. 11 is a block diagram of the OADM node that constitutes the wavelength division multiplexing communication system according to another embodiment of the present invention.

The OADM node as shown in FIG. 7 can also be configured as shown in FIG. 11, which is a block diagram of another OADM node (Node) that constitutes a wavelength division multiplexing communication system according to Embodiment 3 of the present invention. The Node includes a preamplifier 1, a splitter 2, a coupler 3, a switch 4, a variable optical attenuator 5, a coupler 6, an adder 7, a post amplifier 8, a control unit 10, and a spectrum analyzer unit (SAU) 11.

Node of FIG. 11 differs from Node A shown in FIG. 7 in that the coupler 6 is provided after the adder 7, and the spectrum analyzer unit 11 is provided between the coupler 6 and the control unit 10.

That is, the Node of Embodiment 3 includes the coupler 6 and the spectrum analyzer unit 11 after the adder 7 instead of the monitor PD1 9A provided for every channel in FIG. 7. The Node of FIG. 11 outputs the optical signal that is branched off by the coupler 6 to the spectrum analyzer unit 11. The spectrum analyzer unit 11 outputs a voltage based on the optical power level of the branched off optical signal to the control unit 10. The control unit 10 analyzes the voltage received from the spectrum analyzer unit 11, and controls the magnitude of attenuation of the variable optical attenuator 5 as described in Embodiment 1 and Embodiment 2.

Therefore, in the Node of Embodiment 3, since the "off-state" is maintained even if the optical power level of the signal output from the variable optical attenuator 5 becomes greater than recovery threshold Th_r due to accumulation of spontaneous-emission optical signals, generation of an optical leakage can be prevented. Further, since the transition to the "off-state" takes place even if the optical power level of the signal output from the variable optical attenuator 5 does not become less than the disconnection-detection threshold Th_d due to the accumulated spontaneous-emission optical signals, generation of the optical leakage can be prevented.

Embodiment 4

In Nodes according to Embodiments 1 through 3, information about the "off-state" is provided to a down-stream node via the OSC. However, since the OSC provides optical termination for every node, when the wavelength division multiplexing communication system has many relays, the information about the "off-state", and information about transition from the "off-state" may not be timely provided, i.e., a delay is a concern. For example, in the Nodes according to Embodiments 1 through 3, the "off-state" may resume before the information is provided by the OSC, and an optical leakage can occur. The optical leakage can occur more often in a downstream node where the spontaneous-emission optical signal is accumulated.

Figure 12A:
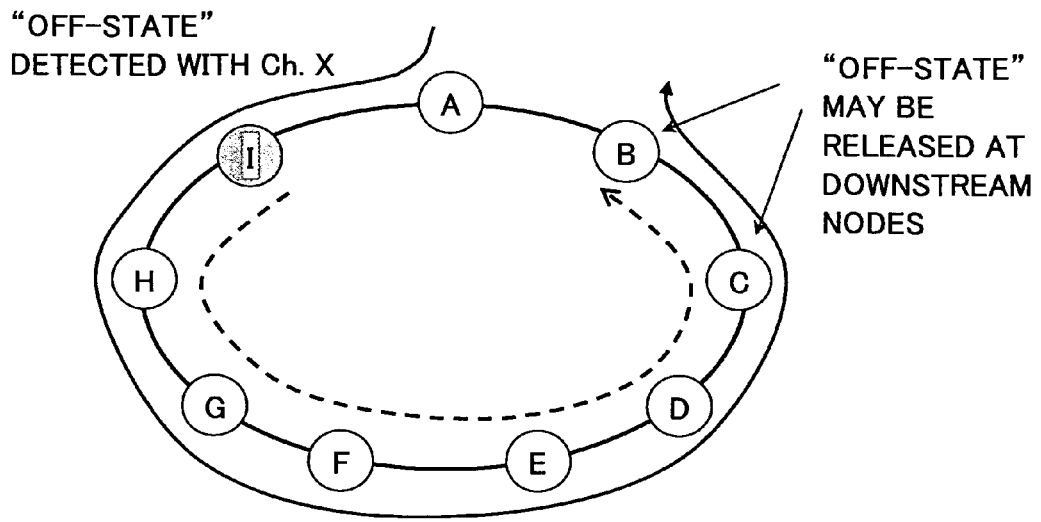
FIGS. 12A and 12B are block diagrams showing examples of the wavelength division multiplexing communication system that are configured in the shape of a ring.
Figure 12B:
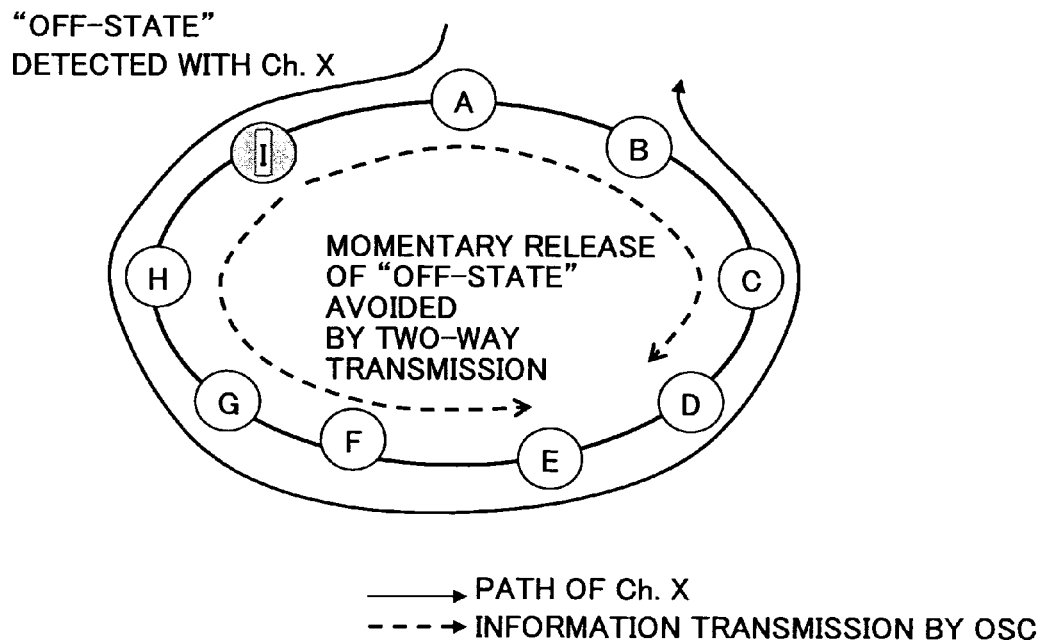

Then, according to Embodiment 4, the wavelength division multiplexing communication system is configured in the shape of a ring as shown in FIGS. 12A and 12B. FIG. 12A shows the case wherein the information about the "off-state" and resumption of the "on-state" is transmitted by the OSC in one direction (forward direction). FIG. 12B shows the case wherein the information about the "off-state" and resumption is transmitted in both directions (the forward and the reverse directions) by the OSC.

FIGS. 12A and 12B shows an example wherein Node I transitions to the "off-state". In FIG. 12A, the information about of the "off-state" is transmitted only in the forward direction (counterclockwise rotation). In FIG. 12B, the information is transmitted both in the forward direction and the opposite direction (clockwise rotation). In the Nodes of Embodiment 4, since the information can quickly reach each node by transmitting the information in both directions by the OSC, momentary generation of the optical leakage can be prevented.

Further, the present invention is not limited to these embodiments, but variations and modifications may be made without departing from the scope of the present invention.

The present application is based on Japanese Priority Application No. 2005-099882 filed on Mar. 30, 2005 with the Japanese Patent Office, the entire contents of which are hereby incorporated by reference.

What is claimed is:

1. A wavelength division multiplexing (WDM) device, comprising:

a level adjusting unit receiving an optical signal, adjusting an optical power level of the received optical signal, and outputting the level-adjusted optical signal; and a controlling unit analyzing the optical power level of the optical signal output from the level adjusting unit, controlling the level adjusting unit so that the optical power level of the output optical signal stays at a constant level, determining whether the WDM device is the furthest upstream WDM device, transitioning to an "off-state" when the optical power level of the output optical signal becomes less than a predetermined disconnection-detection threshold or when a voltage rate of the output optical signal drops below a predetermined threshold rate, so that the level adjusting unit gives a predetermined attenuation to the input optical signal, and transitioning from the "off-state" when the optical power level of the output optical signal is greater than a predetermined recovery threshold, if the WDM device is the furthest upstream WDM device, or when the optical power level of the output optical signal is greater than the predetermined recovery threshold and an upstream wavelength division multiplexing device is not in the "off-state", if the WDM device is not the furthest upstream WDM device.

2. The wavelength division multiplexing device as claimed in claim 1, wherein the controlling unit provides information concerning the "off-state" to a down-stream wavelength division multiplexing device, when the optical power level of the output optical signal becomes less than the disconnection-detection threshold.

3. The wavelength division multiplexing device as claimed in claim 1, further comprising:
   a spectrum analyzer unit for analyzing the optical power level of the optical signal that is output from an adder that adds a plurality of the optical signals output from a plurality of the level adjusting units, the spectrum analyzer unit being provided at a stage later than the adder;
   wherein the spectrum analyzer unit provides information about the optical power level of the optical signal output from the adder to the controlling unit.

4. The wavelength division multiplexing device as claimed in claim 1, wherein the control unit provides information concerning the "off-state" when the optical power level of the output optical signal becomes less than the disconnection-detection threshold, the information being provided in first and second, opposite directions, on a transmission line that is configured in a ring form constituted by the wavelength division multiplexing device and other wavelength division multiplexing devices.

5. An optical leakage prevention method for a wavelength division multiplexing (WDM) device, comprising
   receiving an optical signal, adjusting an optical power level of the input optical signal, and outputting the level-adjusted optical signal;
   analyzing the optical power level of the output optical signal;
   controlling the optical power level of the output optical signal at a constant level;
   determining whether the WDM device is the furthest upstream WDM device;
   transitioning to an "off-state" when the optical power level of the output optical signal becomes less than a predetermined disconnection-detection threshold or when a voltage rate of the output optical signal drops below a predetermined threshold rate and providing a predetermined amount of attenuation to the input optical signal; and
   transitioning from the "off-state" when the optical power level of the output optical signal is greater than a predetermined recovery threshold, if the WDM device is the furthest upstream WDM device, or when the optical power level of the output optical signal is greater than the predetermined recovery threshold and when an upstream wavelength division multiplexing device is not in the "off-state", if the WDM device is not the furthest upstream WDM device.

6. A wavelength division multiplexing communication system that includes a plurality of wavelength division multiplexing (WDM) devices, each wavelength division multiplexing (WDM) device comprising:
   a level adjusting unit receiving an optical signal, adjusting an optical power level of the received optical signal, and outputting the level-adjusted optical signal; and
   a controlling unit analyzing the optical power level of the optical signal output from the level adjusting unit, controlling the level adjusting unit so that the optical power level of the output optical signal stays at a constant level, determining whether the WDM device is the furthest upstream WDM device, transitioning to an "off-state" when the optical power level of the output optical signal becomes less than a predetermined disconnection-detection threshold or when a voltage rate of the output optical signal drops below a predetermined threshold rate, so that the level adjusting unit gives a predetermined attenuation to the input optical signal, and transitioning from the "off-state" when the optical power level of the output optical signal is greater than a predetermined recovery threshold, if the WDM device is the furthest upstream WDM device, or when the optical power level of the output optical signal is greater than the predetermined recovery threshold and an upstream wavelength division multiplexing device is not in the "off-state", if the WDM device is not the furthest upstream WDM device.

7. A wavelength division multiplexing (WDM) device, comprising:
   a level adjusting unit receiving an optical signal, adjusting an optical power level of the received optical signal, and outputting the level-adjusted optical signal; and
   a controlling unit determining whether the WDM device is the furthest upstream WDM device, transitioning to an "off-state" when the optical power level of the output optical signal becomes less than a predetermined disconnection-detection threshold or when a voltage rate of the output optical signal drops below a predetermined threshold rate, so that the level adjusting unit gives a predetermined attenuation to the input optical signal, and transitioning from the "off-state" when the optical power level of the output optical signal is greater than a predetermined recovery threshold, if the WDM device is the furthest upstream WDM device, or when the optical power level of the output optical signal is greater than the predetermined recovery threshold and an upstream wavelength division multiplexing device is not in the "off-state", if the WDM device is not the furthest upstream WDM device.

8. A wavelength division multiplexing (WDM) device, comprising:
   a level adjusting unit receiving an optical signal, adjusting an optical power level of the received optical signal, and outputting the level-adjusted optical signal; and
   a controlling unit analyzing the optical power level of the optical signal output from the level adjusting unit, wherein the controlling unit includes:
   means for controlling the level adjusting unit so that the optical power level of the output optical signal stays at a constant level;
   means for determining whether the WDM device is the furthest upstream WDM device; and
   means for transitioning to an "off-state" when the optical power level of the output optical signal becomes less than a predetermined disconnection-detection threshold or when a voltage rate of the output optical signal drops below a predetermined threshold rate, so that the level adjusting unit gives a predetermined attenuation to the input optical signal, and transitioning from the "off-state" when the optical power level of the output optical signal is greater than a predetermined recovery threshold, if the WDM device is the furthest upstream WDM device, or when the optical power level of the output optical signal is greater than the predetermined recovery threshold and an upstream wavelength division multiplexing device is not in the "off-state", if the WDM device is not the furthest upstream WDM device.

* * * * *

UNITED STATES PATENT AND TRADEMARK OFFICE
CERTIFICATE OF CORRECTION

| | |
|---|---|
| PATENT NO. | : 7,619,813 B2 |
| APPLICATION NO. | : 11/155537 |
| DATED | : November 17, 2009 |
| INVENTOR(S) | : Taizo Maeda et al. |

Page 1 of 1

It is certified that error appears in the above-identified patent and that said Letters Patent is hereby corrected as shown below:

Column 11, Line 24, after "comprising" insert --:--.

Signed and Sealed this

Second Day of February, 2010

David J. Kappos
*Director of the United States Patent and Trademark Office*